No. 740,911. PATENTED OCT. 6, 1903.
S. A. PETO.
SWATH TURNING IMPLEMENT.
APPLICATION FILED SEPT. 2, 1902.
NO MODEL. 2 SHEETS—SHEET 1.
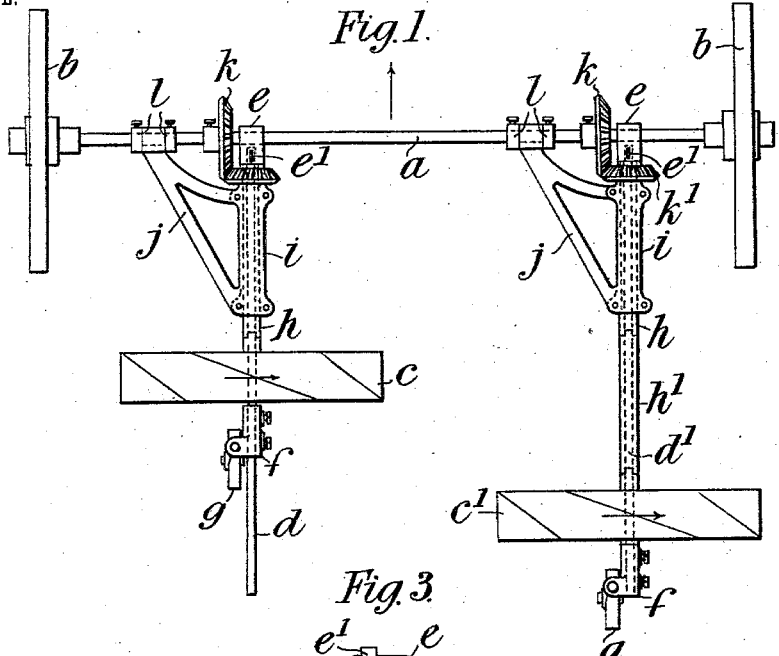
Fig. 1.
Fig. 3.
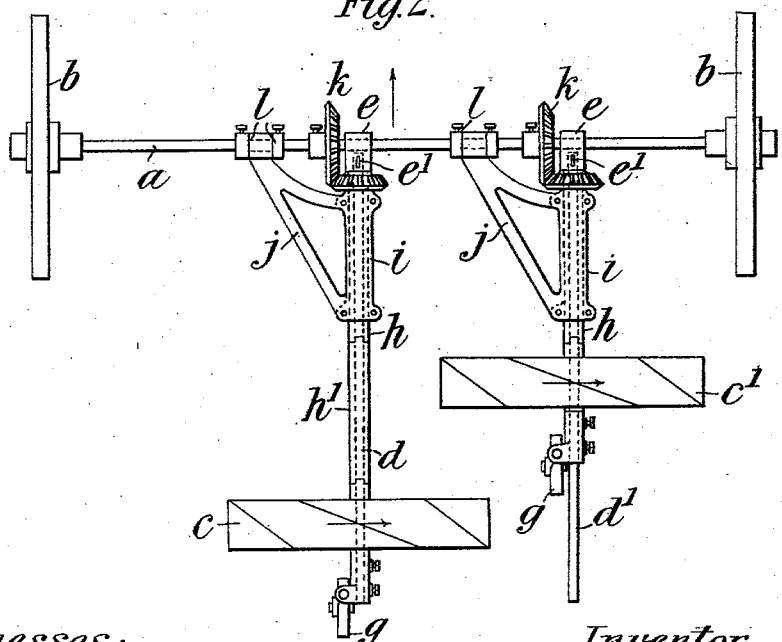
Fig. 2.
Witnesses:
J. K. Moore
F. H. Hubbard
Inventor:
Samuel Arthur Peto
By his atty's
Whitaker Prevost No. 740,911. PATENTED OCT. 6, 1903.
S. A. PETO.
SWATH TURNING IMPLEMENT.
APPLICATION FILED SEPT. 2, 1902.
NO MODEL. 2 SHEETS—SHEET 2.
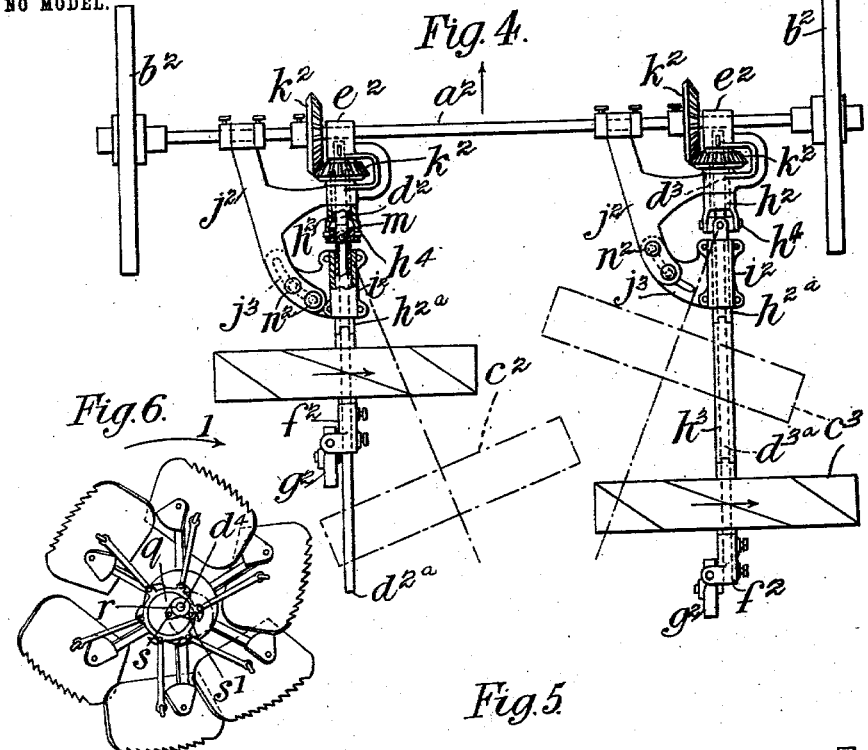
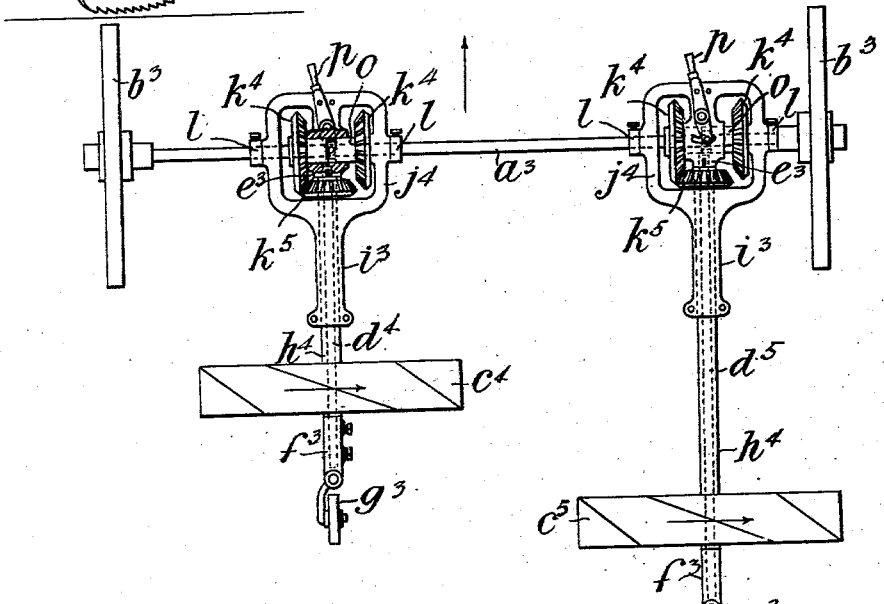

No. 740,911. Patented October 6, 1903.

UNITED STATES PATENT OFFICE.

SAMUEL ARTHUR PETO, OF DOVER, ENGLAND, ASSIGNOR OF ONE-HALF TO THOMAS MARTIN JARMAIN, OF OXFORD, ENGLAND.

SWATH-TURNING IMPLEMENT.

SPECIFICATION forming part of Letters Patent No. 740,911, dated October 6, 1903.

Application filed September 2, 1902. Serial No. 121,883. (No model.)

*To all whom it may concern:*

Be it known that I, SAMUEL ARTHUR PETO, a subject of the King of Great Britain, residing at Goodnestone Park, Dover, England, have invented new and useful Improvements in or Connected with Swath-Turning Implements, of which the following is a specification.

This invention has for its object to adapt rotary swath-turning implements (such as those manufactured under Letters Patent granted to T. M. Jarmain, Nos. 596,114 and 687,314, or wherein two or more sets of revolving devices—such as cones, blades, wings, disks, or tines—hereinafter referred to as "turning-drums," are employed) for the purpose of collecting two or more swaths into a single row or windrow preparatory to cocking or loading into wagons.

In carrying out the said invention I provide for bringing the turning-drums nearer together than when they are used for turning swaths in such a manner that the action of one turning-drum shall be to throw one swath into the path of the second turning-drum, which latter will in turn transfer it together with a second swath onto a third swath, and so on if more than two turning-drums are employed, or alternatively I provide for rotating two turning-drums in opposite directions, so as to collect the material in the path of the two drums into a row between them. In order to provide for this adjustment, I arrange the brackets which carry the spindles or shafts upon which the turning-drums are mounted so that they can be readily adjusted upon the main shaft or axle toward or away from each other, or I can arrange one or both of the spindles so that they can be moved pivotally relatively with the driving-gear to place them out of parallelism.

In a swath-turner of the kind hereinbefore referred to it is usual to place one of the turning-drums in advance of the other—that is to say, if the two turning-drums are turning the swaths from right to left the left-hand turning-drum (standing behind the implement) would be in advance of the right-hand turning-drum, the latter turning the grass toward the space which has been cleared by the foremost turning-drum. It will be obvious, therefore, that when the implement is to be used for collecting swaths this action must be reversed—that is to say, the foremost turning-drum must tend to throw the swath into the path of the rearmost turning-drum. This can be accomplished in different ways—for instance, by providing means whereby the relative positions of the two turning-drums can be varied upon their respective shafts or by altering the direction of rotation of the turning-drums, so that assuming the left-hand turning-drum to be foremost it will throw the row from left to right into the path of the rearmost turning-drum. I advantageously provide for this by arranging upon the main axle or driving-shaft in connection with the bevel-pinion upon each of the shafts carrying turning-drums a pair of bevel-wheels the teeth of which face each other and provide means for driving the shafts from one wheel or the other of the pair, according to the direction of rotation desired.

To enable my invention to be fully understood, I will describe the same by reference to the accompanying drawings, in which—

Figure 1 is a plan view of a swath-turning implement wherein the two turning-drums are adapted to be adjusted relatively with one another for enabling the implement to be used for collecting, the machine being shown as arranged for swath-turning. Fig. 2 is a view similar to Fig. 1, but showing the machine arranged for collecting. Fig. 3 is a sectional view of a detail of the connection between one of the spindles and the axle, drawn to an enlarged scale and hereinafter described. Figs. 4 and 5 are plan views similar to Fig. 1, illustrating modifications of my invention. Fig. 6 illustrates a modification relating to the arrangement shown in Fig. 5.

Similar letters of reference indicate corresponding parts in the several figures.

*a* is the main or driving axle of the implement.

*b b* are the traveling wheels, which are preferably connected with the axle by ratchet-and-pawl mechanism in a well-known manner, so as to allow of the movement of the wheels independently of the axle when the machine is being backed or turned, and *c c'* are the turning-drums, which are advantageously of the kind described in the specification of British patent No. 15,171 of 1896. $d\ d'$ are the spindles, upon which the said turning devices are respectively mounted, the said spindles at their forward ends being secured to brackets $e\ e$ in such a manner that they are held against rotation—for instance, by means of cotters $e'$, as clearly shown in Fig. 3, the said brackets themselves being loose upon the main axle. To the spindles $d\ d'$ behind the turning-drums $c\ c'$ are fixed brackets $f\ f$, carrying caster-wheels $g\ g$ for supporting the turning-drums at the desired height relatively with the ground.

The turning-drums $c\ c'$ are secured to tubular shafts $h\ h$, which rotate upon the spindles $d\ d'$ and are carried in bearings $i\ i$ in brackets $j\ j$ (preferably formed integral with the brackets $e\ e$) on the axle $a$, motion being transmitted to the said tubular shafts through the medium of bevel-wheels $k\ k$, fixed to the said axle, and of other bevel-wheels $k'\ k'$, fixed to the tubular shafts $h\ h$.
In the arrangement of my invention shown in Figs. 1 and 2 one of the shafts $h$ is provided with an extension portion $h'$, which when the implement is used as an ordinary swath-turner is arranged in connection with the turning-drum $c'$, as in Fig. 1, but which when the implement is to be used for collecting is arranged in connection with the turning-drum $c$, as shown in Fig. 2, the turning-drum $c'$ in this case being directly connected with the tubular shaft $h$. The brackets $j\ j$ and also the wheels $k\ k$ are adapted to be adjusted upon the main axle $a$ so as to permit of bringing the turning-drums $c\ c'$ near together, as in Fig. 2. As shown, this adjustment is provided for by means of collars $l\ l$, having set-screws by means of which the position of the collars can be fixed to hold the brackets in any desired position.

It will be understood that when the parts are arranged as shown in Fig. 2 and the turning-drums $c\ c'$ rotating in the direction of the arrows the turning-drum $c'$ will move the hay or the like from right to left into the path of the turning-drum $c$ and the turning-drum $c$ in its turn will move the material again to the right, the material collected by both of the said turning-drums $c\ c'$ being thus collected into a single row.

Instead of removing the tubular shaft $h'$ from one spindle and placing it upon the other in order to alter the relative positions of the turning-drums $c$ and $c'$, as described, I can effect the same result by removing the spindles $d$ and $d'$ (carrying the turning-drums $c\ c'$ and the shaft $h'$) from the brackets $e\ e$ by removing the cotters $e'\ e'$ and interchanging the said spindles. By this arrangement the spindles need not be of equal length, as in the drawings. Other means than the cotters may be employed for connecting the spindles $d\ d'$ to the brackets $e\ e$.

In the arrangement of my invention shown in Fig. 4 provision is made for inclining the spindles toward each other, as indicated by the dotted lines, each of the said spindles being made in two parts $d^2\ d^{2a}$ and $d^3\ d^{3a}$, connected by a knuckle-joint $m$, and the shafts are also made in two parts $h^2$ and $h^{2a}$, connected by a universal joint $h^4$. Each of the brackets $j^2$ is also provided with a slotted segmental portion $j^3$ for allowing the bearing $i^2$ of the spindle to follow the shaft, bolts $n^2\ n^2$ being provided for fixing the segmental portion in any position. In this modification also it is necessary to place the turning-drum $c^3$ in advance of the turning-drum $c^2$ when the machine is used for collecting, as indicated by the dotted lines.

In the modification of the invention shown in Fig. 5 this alteration in the position of the turning-drum $c^4\ c^5$ is not necessary; but provision is made for reversing the direction of rotation of the turning-drums $c^4\ c^5$, so that the turning-drum $c^4$ will move the material which it acts upon from left to right into the path of the turning-drum $c^5$. At the same time, however, it will be necessary to move the axes of the turning-drums $c^4$ and $c^5$ nearer together than is the case when the machine is used for turning the swath.

To provide for altering the direction of the gearing, I arrange in connection with each bevel-wheel $k^5$ a pair of bevel-wheels $k^4\ k^4$, which are connected together by a sleeve $o$ in such a manner that only one of them can gear with the wheel $k^5$ at a time. This pair of bevel-wheels $k^4\ k^4$ is connected with the shaft by a key or feather and is adapted to be moved to cause either wheel to engage with the wheel $k^5$ by means of a lever $p$, mounted on the bracket $j^4$ and having a pin engaging with a groove in the connecting-sleeve $o$. In this modification the bracket $e^3$, to which the spindle $d^4$ or $d^5$ is fixed, is formed in one with its bracket $j^4$ and embraces the sleeve $o$ instead of the main shaft $a^3$, as in the arrangement hereinbefore described.

It will be understood that when the implement just described is to be used for collecting the turning-drums $c^4\ c^5$ are moved toward each other and that the right-hand wheel of each pair $k^4\ k^4$ is engaged with the pinions $k^5$ instead of the left-hand wheels, as shown in the drawings. If with this modification each of the turning-drums $c^4\ c^5$ is provided with pivoted blades linked to an eccentric, as described in the specification of Letters Patent No. 687,314, the thrust of the eccentric must be in the opposite direction to that described in the said specification, and to permit of this I arrange for altering the position of the eccentric upon the spindle $d^4$ or $d^5$, carrying the turning-drum—for instance, as illustrated in Fig. 6, wherein the eccentric $q$ is adjustably mounted upon its supporting-bracket $r$, the latter being provided with two lugs $s\ s'$, to either of which the eccentric can be fixed by a screw. When the turning-drum is rotated in the direction of the arrow 1 for swath-turning, the eccentric is secured to the lug $s$, while when the turning-drum is to be rotated in the reverse direction for collecting the eccentric is moved to the position indicated by the dotted circle and secured to the lug $s'$. With this modification it will be obvious that it is possible to arrange one drum to rotate in the opposite direction to the other drum, in which case the material acted upon by the two drums as the implement travels will be collected in a row between the said drums. In this case it is not necessary to provide for bringing the two drums near together, as hereinbefore described.

The specific form of machine illustrated in Fig. 5 is not claimed herein, but is reserved for the subject-matter of another application to be filed by me hereinafter.

Having now particularly described and ascertained the nature of my said invention and in what manner the same is to be performed, I declare that what I claim is—

1. In a swath-turning implement, the combination with the frame, of turning-drums connected therewith, having their direction of rotation across the line of draft, one of said drums being located in advance of the other, of devices whereby the leading drum is caused to deliver the material away from or toward the following drum, whereby the implement may be used either to turn the material or to collect it in windrows, substantially as described.

2. In a swath-turning implement, the combination with a main frame, of turning-drums adapted to operate transversely of the line of draft, one of said drums being located in advance of the other, of devices for adjusting said drums toward and from each other and devices whereby the leading drum is caused to deliver the material into or away from the path of the following drum whereby the machine can be used either to turn the material or collect it in windrows, substantially as described.

3. In a swath-turning implement, the combination with the frame and driving-shaft, of turning-drums, adapted to rotate transversely of the line of draft, spindles supporting said drums, and operatively connected with the said shaft, one of said drums being located in advance of the other, mechanism for adjusting said spindles to bring the turning-drums nearer together or farther apart and means for altering the relative positions of said drums to place one or the other in the lead, substantially as described.

4. In a swath-turning implement, the combination with a main frame and driving-shaft, of turning-drums one located in advance of the other and both adapted to rotate transversely of the line of draft, and supporting and detachable driving devices for each of said drums whereby said drums may be interchanged with respect to their driving devices, substantially as described.

5. In a swath-turning implement, the combination with a main frame and driving-shaft, of brackets adjustably secured on said shaft, spindles connected to said brackets and extending rearwardly of the driving-shaft, turning-drums carried by said spindles, one being arranged in advance of the other, driving mechanism for said drums and devices whereby one or the other of said drums may be placed in the lead, substantially as described.

6. In a swath-turning implement, the combination with the main frame and driving-shaft, of spindles extending rearwardly therefrom, turning-drums located on said spindles, driving mechanism connecting said shaft and said drums and mechanism for placing said spindles at an angle to the driving-shaft, substantially as described.

7. In a swath-turning implement, the combination with the main frame and driving-shaft, of spindles extending rearwardly therefrom, turning-drums located on said spindles, driving mechanism connecting said shaft and said drums and mechanism for placing said spindles at an angle to the driving-shaft, and devices for placing one or the other of the said drums in the lead, substantially as described.

SAMUEL ARTHUR PETO.

Witnesses:
HERBERT SELLEY,
HERBERT W. PRIOR.